Nov. 16, 1971     A. E. WILDE     3,620,028
PIPE LAY DOWN APPARATUS
Filed May 5, 1969     3 Sheets-Sheet 2
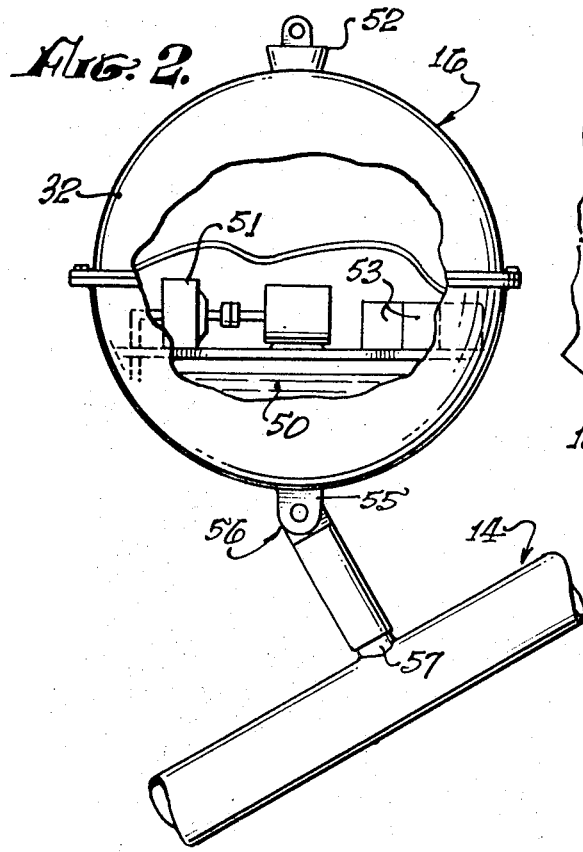
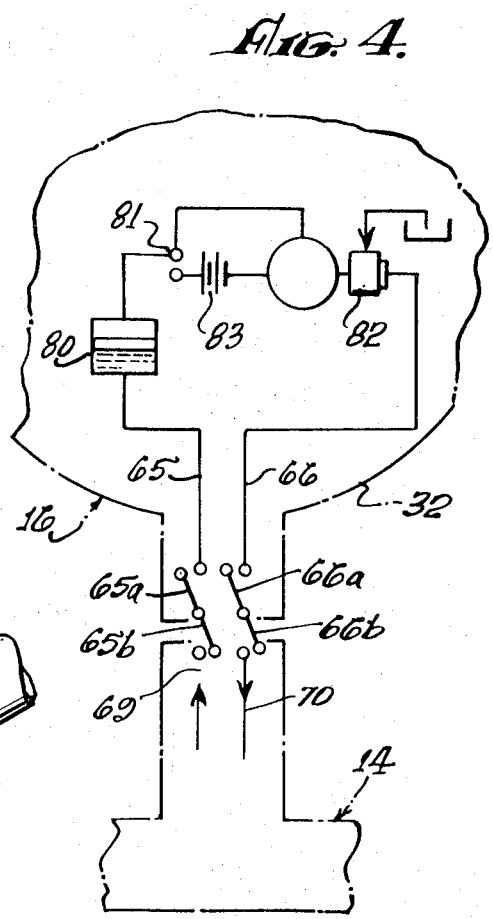
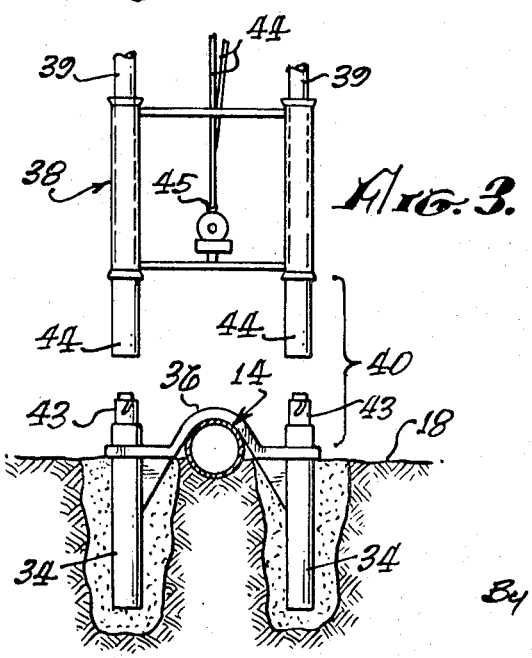
INVENTOR.
ARTHUR E. WILDE,
By HIS ATTORNEYS
Spensley & Horn

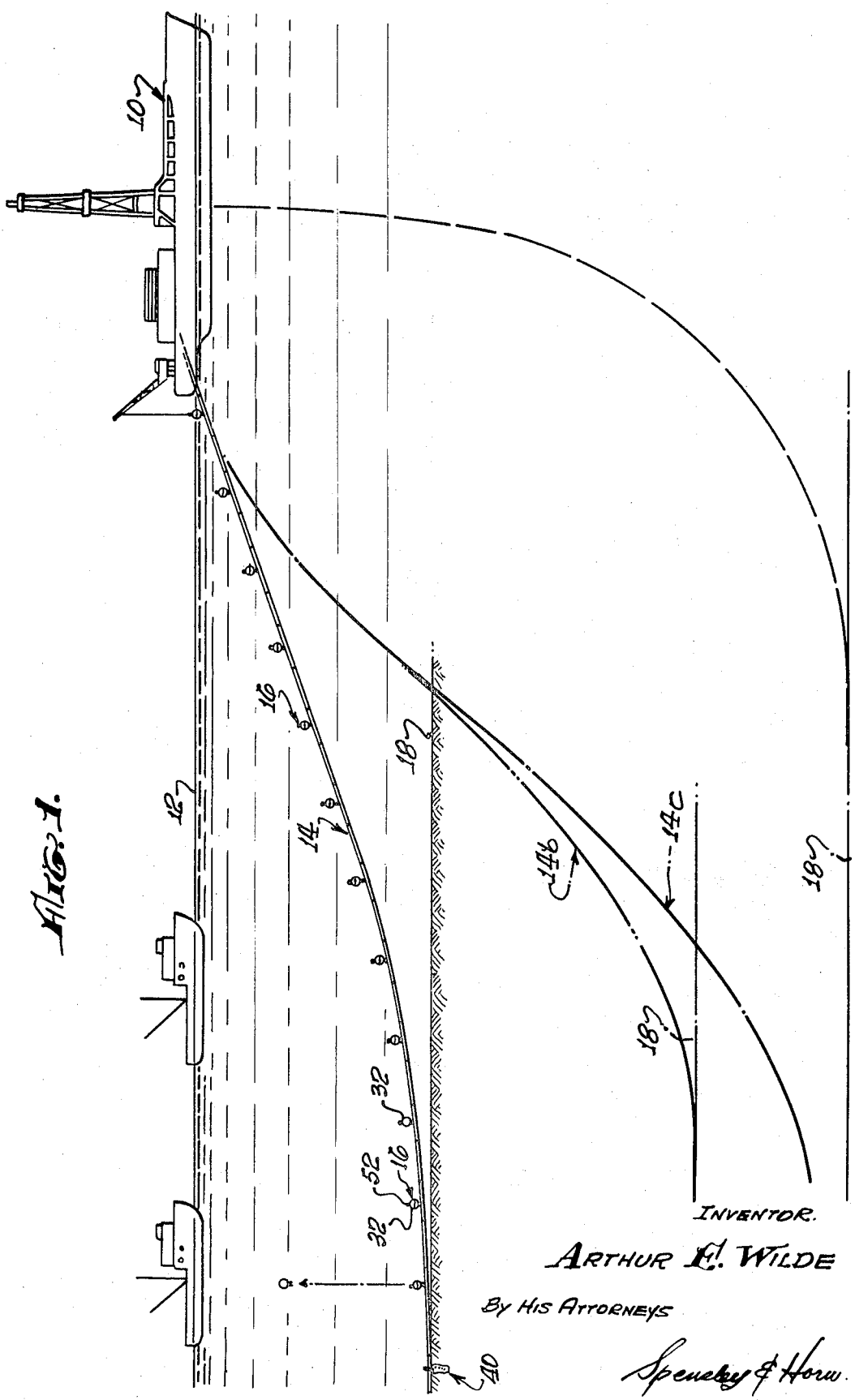

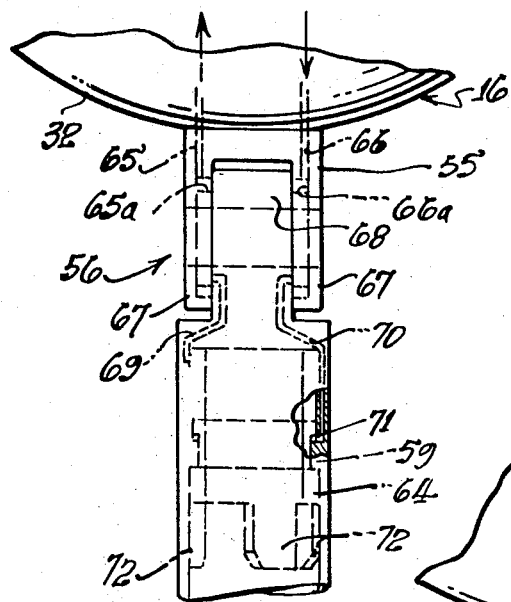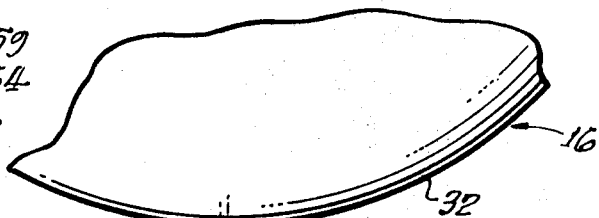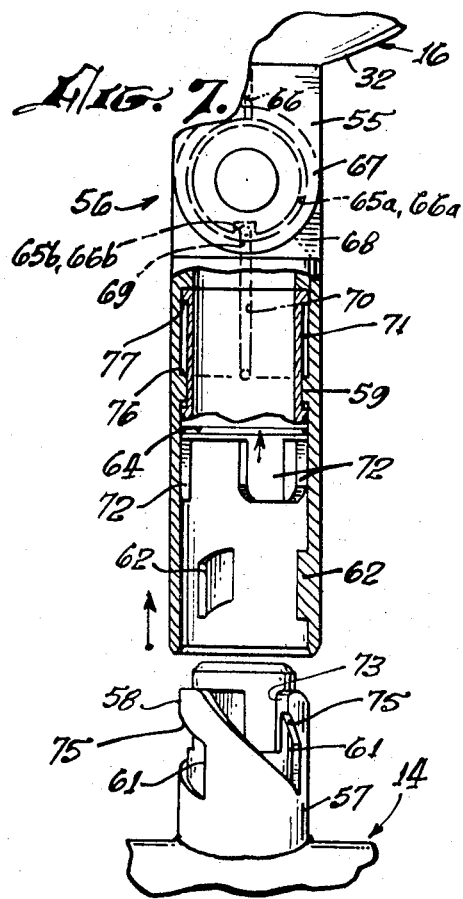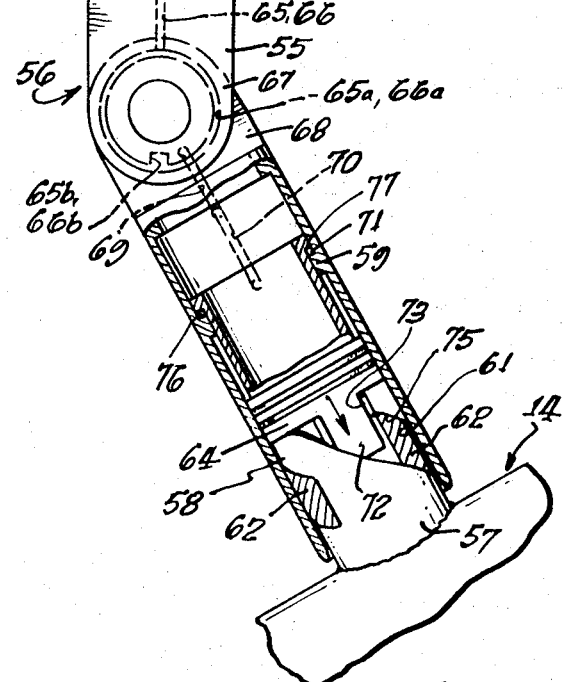

3,620,028
PIPE LAY DOWN APPARATUS
Arthur E. Wilde, Garden Grove, Calif., assignor to Western Offshore Drilling & Exploration Company, Los Angeles, Calif.
Filed May 5, 1969, Ser. No. 821,765
Int. Cl. F16l 1/00
U.S. Cl. 61—72.3
2 Claims

ABSTRACT OF THE DISCLOSURE

A method and apparatus for laying subsea pipelines comprising the steps of attaching buoyant bodies, constructed in accordance with the present invention, at calculated predetermined distances along the pipeline to be laid; lowering the length of pipe with the bodies attached so that the curvature of the pipeline as it leaves the surface vessel, does not exceed a calculated angle; attaching the pipeline to the ocean floor; and causing the buoyant bodies of the present invention to be released and recovered. The buoyant body is of a hollow configuration with self-contained means for releasing the buoyant body from the pipe when the pipe reaches a substantially horizontal position on the subsea floor.

BACKGROUND OF THE INVENTION

(1) Field of the invention

This invention relates to a method and apparatus for laying pipeline on the floor of a large body of water and a method for anchoring the pipeline. More particularly this invention relates to a method of anchoring and lowering pipeline to the ocean floor by means of buoyant spheres.

(2) Description of the prior art

One of the basic requirements of laying subsea pipeline is to prevent overstressing during the installation. As the pipe is lowered through the water the bending stress is maximum near the point where it is lowered from a vessel and also at the point as it nears the sea floor. The bending stresses are critical in these two regions. It is desirable to prevent permanent bending of the pipe, therefore, the stress levels in the regions must be kept below the minimum yield stress of the pipe. It can be readily seen that the problem of bending stresses becomes more severe as the depth of water increases since the weight of the pipe being lowered causes more acute bending at the lowering point and at the bottom as a direct function of the depth.

As the necessity for submarine pipelines has developed, equipment and techniques have been adapted from those used in installing lines on land, in the marshes and across inland bays and rivers. Several methods of installing offshore pipelines have evolved. The methods in general use are the bottom tow pull method, the floatation method, the reel or spool method and the lay barge method. The bottom tow and floatation methods require work areas on shore at the project location for the preparation of pipe sections which are either pulled along the bottom or floated on the surface to the final position or location of the line. These methods are vulnerable to rough water conditions and are usually restricted to inland bays and river crossings. The pull method can sometimes be used for short tanker loading facilities but as the length of the line increases the amount of pulling power and its anchorage requirement increases. The reel method of installation has evolved from cable laying methods and is only applicable for small diameter pipe. Another widely used method is the lay barge method for installing offshore pipelines. This method uses a large lay barge specially designed and equipped for handling pipe from three (3) inches to forty-eight (48) inches in diameter. However, even with the lay barge it is essential that a method be provided whereby the pipe, as it is lowered to the ocean floor, is maintained in a configuration that does not overstress the pipe. The new and improved method and apparatus for laying and anchoring subsea pipeline, hereinafter described in detail, utilizes a series of buoyant spheres attached at intervals along the pipe to support the pipe in a predetermined configuration as it is lowered through the water. The spheres are released when the pipe has been anchored on the ocean floor and can be recovered. Anchoring means which are hydraulically operated and which remain attached to the pipe can be utilized as part of the apparatus when desired.

SUMMARY OF THE INVENTION

Accordingly, it is a primary object of the present invention to provide a method and apparatus of installing the pipe on the ocean floor whereby the pipe is not overstressed during the lowering operation.

Another object of the present invention is to provide a method of installing pipeline on the ocean floor whereby, a plurality of buoyancy spheres are attached at intervals along the pipeline to support the pipeline in a predetermined configuration as it is lowered through the water to the ocean floor.

Still another object of the present invention is to provide an anchoring means for pipeline that has been laid along the ocean floor to prevent movement of the pipe due to water currents or seismic disturbances.

Yet another object of the present invention is to provide detachable buoyant bodies that can be attached to a pipeline to be lowered to the ocean floor to provide buoyancy while the pipe is being lowered and which can be released and recovered after the pipeline has been positioned on the ocean floor.

A further object of the invention is to provide such buoyancy spheres wherein the degree of buoyancy can be controlled to in turn control the angle of descent of the pipeline.

In one of its broadest aspects the invention comprises a method of laying submarine pipeline comprising the steps of attaching buoyant spheres to a pipeline to be installed; lowering the pipeline into the water from a surface vessel such that there are no acute bends in the line, and allowing the line to sink to the floor of the body of water causing the buoyant spheres to be released and recovered and anchoring the pipeline to the ocean floor.

The spheres are attached to the pipeline at calculated predetermined intervals such that the pipeline will not be subjected to excessive bending forces while being lowered into the water and thus, become overstressed due to its weight. Once located on the floor of the body of water, the spheres are automatically released and returned to the surface where they are recovered. The pipeline can be anchored to the ocean floor by anchors that are hydraulically driven into the ocean floor and which are expendable.

No attachments from the surface are required as in the prior art, where continuous cables are attached to the pipeline as it is being lowered. The buoyancy spheres are recovered after release from the pipeline. The degree of buoyancy of the spheres and the hydraulically operated anchoring means can be remotely operated. Thus, there is provided a rapid and efficient method of lowering submarine pipeline to the floor of a body of water, and anchoring it therein.

BRIEF DESCRIPTION OF THE DRAWINGS

FIG. 1 is a diagrammatic representation of pipeline being lowered from a barge with buoyant spheres in accordance with the present invention attached to the pipeline;

FIG. 2 is a side elevation partially sectioned of a buoyant sphere attached to the pipeline;

FIG. 3 is a side elevation of the hydraulic anchoring means employed to anchor the pipeline;

FIG. 4 is a schematic view of a presently preferred releasing circuit of the present invention;

FIGS. 5, 6 and 7 are partial detailed views of the connector section of the buoyant sphere in the connected and the disconnect orientation.

DESCRIPTION OF THE PREFERRED EMBODIMENT

The present invention comprises a method and apparatus for laying submarine pipeline on the floor of a deep body of water. As shown in FIG. 1, a laying barge 10, on the water surface 12, lowers pipeline 14 of any given diameter into the water with spheres 16 attached at predetermined intervals. The pipeline is lowered to the ocean floor 18. The buoyancy of the spheres prevents the pipe from developing severe sags or bends. Pipeline anchoring means 34 shown in FIG. 3 are hydraulically driven into the ocean floor 18, by hydraulic means are recovered onto the laying barge.

More specifically now with reference to FIG. 1, there is shown a laying barge 10 on the surface of the ocean 12 from which pipeline 14 is being lowered into the water. Buoyancy spheres 16 described in greater detail hereinafter, are attached at a predetermined interval along the pipeline. The spheres are attached to the pipeline so that the pipeline assumes an optimum curve while being lowered into the water. The optimum curve for a given depth of water can be calculated as a function of the length of pipe and the depth of the water. In order to vary the descent angle of the pipeline means are provided in the spheres for varying the buoyancy thereof by varying the quantity of water therein as ballast.

As the pipe 14 is lowered with the spheres 16 attached it assumes a mild curve with the bottom portion of the curve lying flat upon the ocean floor 18. As shown schematically in FIG. 1 the curve becomes more acute at increased depths as illustrated by phantom lines 14b, 14c.

Referring now to FIG. 3 there is shown a presently preferred means for anchoring the pipeline which has been lowered to the ocean floor by means of the buoyant spheres in accordance with the present invention. With the pipeline in position the pipeline is anchored to the ocean floor by means of sections of pipe 34 serving as anchors which are positioned adjacent to, and on either side of the pipeline 14 such that a strap 36 extends over the pipeline to hold it in position. In order to set the anchors an anchoring assembly 40 is lowered from the vessel. The anchoring assembly comprises the two anchor pipes 34 joined by the strap 36 with a portion of a remotely releasable connector affixed at the upper end of each of the pipe anchors 34. In the embodiment shown a male section of a quick disconnect connector of the type well known to the art, is affixed at the upper end of each of the pipe sections 34. The connector section is shown as a male section 43 which serves as the mandrel portion of the remotely releasable connector. The lowering assembly 38 includes the corresponding female portions 44 of the quick connect joint together with hydraulic lines 46 which extend to the vessel and suitable tubular lowering strings 39. There is also contained on the anchoring assembly a TV camera or a magnetometer 45 which can be used to locate the pipeline. Thus, referring to FIG. 3, as the pipe is laid the anchors are set by being lowered with the male and female portions of the connector connected. When the pipe anchors 34 have been located at each side of the pipeline hydraulic fluid is pumped down the assembly through pipe strings 39 to jet the pipeline anchor to the required depth at which the strap 36 extends across and holds down the pipeline. After the pipe anchors 34 have been set to anchoring depths they are cemented in place by methods well known to the art. The remotely releasable connector is of the type well known to the art as for example, that shown and described in U.S. Letters Patent No. 3,056,614, issued to Ross A. McClintock et al. Such connectors are of the type wherein by means of a latching bar or a hydraulic line an internal cylinder can be raised within the connector assembly to allow disconnection of the female from the male portions.

As each section of pipe is laid the buoyancy sphere 16 attached to that section releases automatically and because of its buoyancy, floats to the surface where it can be recovered.

Referring now particularly to FIGS. 2 through 6, a presently preferred embodiment of the buoyancy sphere of the present invention is illustrated. The buoyancy sphere 16 comprises a spherical hollow body 32 having therein ballast tanks 50 into which sea water can be taken in or expelled by pump means 51 contained within the sphere. At the top of the sphere is a cone-type receiver 52 which acts as a guide when an emergency lift of the sphere is required. Contained within the sphere is a source of electric power which in this embodiment is a number of batteries 53 for operation of the hydraulic pump 36 contained therein. Depending from this sphere 16 is a stem 55 which terminates in a swivel joint 56 which swivel joint has attached thereto a portion of a remotely releasable connector which can be electrically or hydraulically operated.

In the presently preferred embodiment a remote release connector of the type previously described is utilized and is shown in FIGS. 5, 6 and 7, as the means for automatically releasing the buoyant sphere from the pipeline when the pipeline has reached its horizontal position on the ocean floor. Thus, in this embodiment there is affixed to the pipeline transversely to the longitudinally axis thereof, a mandrel 57 which terminates in the male section 58 of a connector. Below the swivel joint of the stem 55 a female portion 59 of a disconnect joint is attached and is mateable with the male section affixed to the pipeline. The male section mandrel is shown particularly in FIG. 7 and is of the type having key slots 61 into which the lugs 62 of the female section fit with the male-female mating being retained by a movable cylindrical sleeve 64 contained within the female section. Such sleeve can be raised to disconnect the connector by any suitable means but in the presently preferred embodiment the disconnect sleeve is raised by hydraulic pressure generated by the pump 36 within the buoyant sphere. In this connection an inlet flow passage 65 and outlet flow passage 66 are formed through the wall of the stem 55. The passages 65 and 66 terminate at the interior wall 67 of the swivel joint in such manner that they are closed by the mating wall 68 of the swivel joint except when flow passages 69 and 70 in the wall of the female connector 59 extending from the exterior portion of the swivel joint are in alignment therewith. Thus, in the presently preferred embodiment the passages 65 and 66 are in communication with annular grooves 65a and 66a in the intermediate portion of the swivel joint. The annular rings in turn open into an alignment notch 65b and 66b in alignment with the passages 65 and 66. When flow passages 69 and 70 terminate at the notches the passages 69 and 70 are thus in communication with passages 65 and 66 only when the stem 55 and mandrel section of the connector are transverse to the axis of the pipeline. Thus, referring to FIGS. 2 and 5 through 7, alignment of the flow passages occurs with resultant release of the buoyancy sphere as described hereinafter from the pipeline when the pipeline reaches a horizontal position.

In the presently preferred embodiment release is accomplished by use of a hydraulically actuated quick release joint, such release joint being of the type well known to the art.

Referring now to FIGS. 4 through 7, in FIG. 4 the release mechanism of the present invention is shown schematically. The orientation of the flow passages as shown in FIG. 4 are out of alignment corresponding to their orientation when the pipeline is being lowered as shown in FIGS. 2 and 6. The passages 65 and 66 are thus not in communication with passages 69 and 70. When the pipeline reaches a horizontal position the passages 65 and 66 are brought into alignment with passages 69 and 70 by movement of 65a, 65b and 66a, 66b in FIG. 4. Passage 69 has an outlet to ambient and thus water under pressure is admitted to passage 65. The pressure of the water causes actuation of a dash pot 80 which in turn closes a switch 81 to actuate a motor operated pump 82 which is powered by a battery 83. The motor driven pump then pumps fluid at high pressure through passage 66 and into 70 and into the annulus 71 (FIGS. 6 and 7) defined in the female portion 59 of the release joint by the relationship of the locking sleeve 64 and female body 59. Thus, the male and female portions of the release joint are connected and locked by the insertion of the male mandrel 57 into the female body. The lugs 62 on the interior wall of the body slide downwardly into the key slots 61 by a partial rotation into the helical slots. It is necessary in order to separate the male and female portions to rotate them relatively through a partial turn since in the fully engaged position the lugs are beneath a shoulder 75 in the key slot. In the locked condition the cylindrical sleeve has fingers 72 which mate with secondary vertical slots 73 and extend radially outwardly into the key slots such that the lugs 62 cannot be rotated from beneath the shoulders 75. In order to release the connector it is necessary to raise the cylindrical sleeve until the fingers 72 are out of the key slots and the lugs 62 can rotate sufficiently to pass out of the key slots 61. In the illustrated embodiment the locking cylindrical sleeve is raised by the hydraulic pressure in the annulus 71, The annulus 71 is defined between the exterior wall of the locking sleeve 64 and the interior wall of the female housing 59. The annulus is closed at its ends by a fixed shoulder 76 on the female housing and a shoulder 77 on the upper end of the locking sleeve. Thus, liquid under pressure admitted between the shoulders 76 and 77 through the passage 70 forces the locking sleeve upwardly by reason of the fluid pressure on the shoulder 77. As shown in FIG. 7, when the locking sleeve moves out of the locking position the disconnect is free to separate and the buoyancy of the sphere causes the connection to be broken and the sphere to rise to the surface.

In operation to lay barge 10 upon the surface of the water 12 lowers a pipeline of specified diameter and wall thickness into the water. Buoyancy spheres 16 are attached to the pipe at regulated intervals according to the equation previously described so that the weight of the pipe as it is lowered into the water will not cause acute bending or sag and will prevent the pipe from being overstressed or buckled. As the length of pipe is lowered onto the ocean floor anchor means 34 comprising two mandrels and strap 36 is placed to straddle the pipe and is hydraulically driven into the ocean floor until the pipe is anchored.

The buoyance spheers 16 are then released through electrically operated release joints and rise to the surface where they can be recovered.

It is apparent from the foregoing that the invented method and apparatus has many advantages over the prior art methods. It is now possible to retain a desired pipeline curvature as the pipe is lowered through the water throuhg a series of independently attached floatation spheres. The spheres can be attached to the pipeline to provide any desired buoyancy effect so that the radius of curvature of any section of the pipe can be controlled. The spheres can be acoustically and remotely operated to release whereupon they rise to the surface and can be recovered. Another significant feature of the invented method and apparatus are the hydraulically operated anchoring means which remain embedded in the ocean floor and which anchor the pipeline securely to prevent movement caused by water currents or seismic effects. The invented apparatus and method greatly alleviate the problem of curvature and overstressing and overcome the necessity for excessively long cables and haphazard laying methods of the prior art which also limit the diameter of the pipe that can be laid and also require the pipe to have thick walls to prevent any possible buckling or other damage due to overstressing the pipe.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. Apparatus for laying submarine pipeline on the floor of a body of water comprising:
    a pipeline;
    a plurality of mandrels attached to said pipeline at spaced apart positions along said pipeline;
    a plurality of buoyant bodies;
    a releasable coupling conencting each of said buoyant bodies to respective ones of said mandrels, said buoyant bodies when so connected partially supporting the weight of said pipeline in the water, said buoyant bodies being transverse to said pipeline when said pipeline is horizontal; and
    release means for releasing each said coupling, said release means comprising a sensing means, a hydraulic pumping means within said buoyant body, and a hydraulically actuated release means connected thereto, said sensing means being adapted to actuate said hydraulic pump when said buoyant body assumes said transverse orientation, said hydraulic pump actuating said hydraulically actuated release means to allow separation of said buoyant body from said pipeline.

2. The apparatus as defined in claim 1 in which said release coupling includes a female to male interlock comprising a female member, a male member and a locking sleeve;
    said male member having helically disposed key slots and further having axially disposed key slots;
    said female member having internally protruding members adapted to engage said helically disposed key slots in said male member;
    said locking sleeve having axially disposed locking fingers adapted to engage said axially disposed key slots in said male member and further adapted to prevent the relative rotation between said male and said female mmebers when said locking sleeve is in first axial position;
    said locking sleeve being adapted to be moved to a second axial position by the operation of said hydraulic pumping means so as to allow relative rotation between said male and said female members and disconnection of said male and said femael members thereby.

References Cited

UNITED STATES PATENTS

| | | | |
|---|---|---|---|
| 2,770,950 | 11/1956 | Collins | 61—72.3 |
| 3,262,275 | 7/1966 | Perret | 61—72.3 |
| 3,399,646 | 9/1968 | Vincent | 61—72.3 X |
| 3,427,812 | 2/1969 | Hollander | 61—72.3 |

FOREIGN PATENTS

| | | | |
|---|---|---|---|
| 80,801 | 1963 | France | 61—72.3 |

OTHER REFERENCES

Oil & Gas Journal of Aug. 7, 1967 (Vol. 65, No. 32) pp. 118, 120 and 121.

JACOB SHAPIRO, Primary Examiner

U.S. Cl. X.R.

114—.5